(No Model.)
S. F. SUTHERLAND.
BRAKE FOR HAND TRUCKS.
No. 550,569. Patented Nov. 26, 1895.
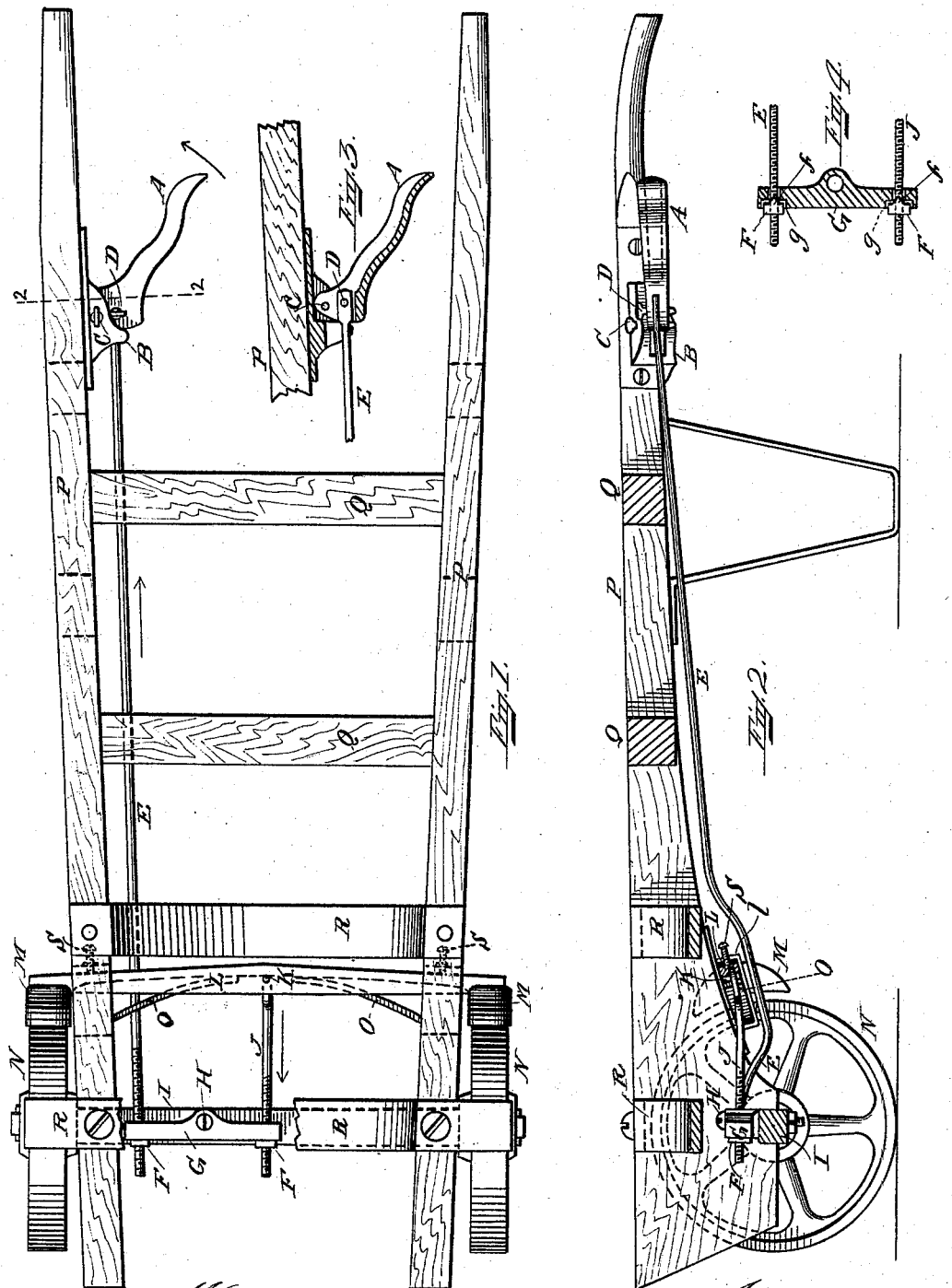

UNITED STATES PATENT OFFICE.

SIMON F. SUTHERLAND, OF BOSTON, MASSACHUSETTS.

BRAKE FOR HAND-TRUCKS.

SPECIFICATION forming part of Letters Patent No. 550,569, dated November 26, 1895.

Application filed May 3, 1895. Serial No. 548,072. (No model.)

*To all whom it may concern:*

Be it known that I, SIMON F. SUTHERLAND, a resident of Boston, in the county of Suffolk and State of Massachusetts, have invented a new and useful Improvement in Brakes for Trucks, of which the following, taken in connection with the accompanying drawings, is a specification.

My invention relates to brakes for hand-trucks; and the objects of my invention are to provide means for quickly applying a brake of strong force to the wheels by simple movement and also to afford an easy and durable attachment of the mechanism to the trucks. Although my mechanism is shown applied to a hand-truck, it may be readily applied to other vehicles, whether propelled by hand or other force. I attain these objects by means of the mechanism illustrated in the accompanying drawings, in which—

Figure 1 is a top view of my mechanism placed in a truck; Fig. 2, a side view of the same; Fig. 3, a detailed view of the hand-lever and its arrangement; Fig. 4, a detailed view of the bar and rod forming part of my mechanism.

Similar letters refer to similar parts throughout the views.

A is the hand-lever, of metal, concaved, as shown in Fig. 3.

B is a metal plate bolted to the hand-rail P of the truck about four inches from the end, provided with lips through which passes the pivot C, pivoting the lever A therein. The plate B is provided with a shoulder, as shown in Fig. 3, to prevent the lever A from going back too far.

E is a rod of steel pivoted to the lever A by pivot D and passing under the cross-bars Q Q of the truck and the metal bars R R.

H is the pivot which pivots the metal bar G to the axle I. The bar G has two square mortises *g g*, three-sixteenths of an inch deep on the inner side, from which run bores through which pass the rods E and J, said bores being about one-eighth of an inch larger around than the bars E and G, that threads on said bars may not be abraded.

F F are nuts having a knife-edge *f f* and provided with threads corresponding to similar threads on the bars E and G, on which they are respectively adjusted in the mortises *g g*. The knife-edges *f f* of the nuts enable the nuts to be held firmly in place in the mortises and bores and give a pivotal arrangement to the bars E and G.

J is a metal bar held in the bar G, as described, and to the brake-beam L, which is of metal, by pivot K.

O O are springs of tempered brass, having one end fixed in casing *l*, which is fastened on under sides of the carriage, and having the other end resting against the brake-beam L, which is hollowed to receive them, and which assist in throwing back the brake-beam after application of the brake for a new application. The casing *l* is a metal frame fixed to the hand-rail P on the under side, as shown in Fig. 2.

M M are brass or copper shoes fixed to brake-beam L and arranged to bear upon the wheels N N. Said shoes are about one-eighth of an inch or so distant from the wheels when not bearing thereon.

Q Q and R R are cross-bars forming the frame of the truck with the hand-rails.

By pressing the lever A the rod E, by the actuating of the bar G on its pivot, pulls back the rod J and thus brings back the brake-beam L and presses the shoes M M against the wheels N N and thus stops the vehicle or truck. By letting go the pressure on the lever A the brake-beam L, with shoes M M, is forced away by the action of springs O O upon beam L.

S S are adjusting-screws in the casing *l*, by which when an adjustment of brass shoes M M closer to the wheels N N is required on account of wear or other reasons such arrangement may be made by the screws S S bearing against the brake-beam L in said casing. It is thus obvious that a very slight pressure at lever A exerts a force on the lever-rod, which is extended to the pressure of the shoes against the wheels, making a powerful brake, the ratio of pounds on brake-shoes to pounds of pressure on lever A being as one hundred to one. When applied to other vehicles than that shown, the action of the lever-rods and lever is the same, the application of the energy at the lever being adapted to the circumstances, as required.

Having described my invention, what I claim, and desire to secure by Letters Patent, is—

1. In a brake the combination of a rod having a thread thereon with a nut having a knife edge and thread corresponding to the thread on said rod and said nut being arranged in a mortise of a bar at the outer end of a bore in said bar through which said rod passes; all substantially as described and set forth.

2. In a brake in combination the lever A pivoted in the metal plate B by the pivot C the said plate B being bolted to the hand rail P of a truck, the metal rod E pivoted to the lever A by the pivot D, the metal bar G pivoted to the axle I by the pivot H and having mortises $g\ g$ and bores connected with said mortises, the metal rod E having one end pivoted to lever A and the other end passing through the bore of the bar G, the rod J, having one end passing through the metal bar G and pivoted to the brake beam L by pivot K, the threaded nuts F F on the ends of the rods E and J which have a corresponding thread said nuts having a knife edge $f$ and adjusted in the mortises $g\ g$ of the bar G, the brake beam L having the metal shoes M M on each end thereof, the wheels N N and the casings $l$, $l$ fixed to the under side of the frame, the springs O O having one end fixed in said casings $l$, $l$ and the other end resting against the concave part of the brake beam L, the adjusting screws S S arranged in the casings $l\ l$ and bearing against the brake beam L in said casings $l\ l$; all substantially as described and for the purpose set forth.

In testimony whereof I have signed my name to this specification, in the presence of two subscribing witnesses, on this 28th day of January, A. D. 1895.

SIMON F. SUTHERLAND.

Witnesses:
E. C. MITCHELL, Jr.,
H. DUNHAM.